US007672109B2

(12) United States Patent
Nitsche et al.

(10) Patent No.: US 7,672,109 B2

(45) Date of Patent: Mar. 2, 2010

(54) SAFETY SWITCHING APPARATUS FOR SAFE DISCONNECTION OF AN ELECTRICAL LOAD

(75) Inventors: Thomas Nitsche, Esslingen (DE); Hans Schwenkel, Stuttgart (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/858,925

(22) Filed: Sep. 21, 2007

(65) Prior Publication Data

US 2008/0067876 A1 Mar. 20, 2008

Related U.S. Application Data

(63) Continuation of application No. PCT/EP2006/001484, filed on Feb. 18, 2006.

(30) Foreign Application Priority Data

Mar. 22, 2005 (DE) ....................... 10 2005 014 125

(51) Int. Cl.
*H02H 7/00* (2006.01)

(52) U.S. Cl. ...................................................... 361/115

(58) Field of Classification Search .................. 361/115
See application file for complete search history.

(56) References Cited

U.S. PATENT DOCUMENTS 4,745,747 A * 5/1988 Krausse et al. ................ 60/452
4,940,102 A * 7/1990 Morishita ................... 180/446
5,232,582 A * 8/1993 Takahashi et al. ............. 210/86
5,483,039 A * 1/1996 Gallagher .............. 219/125.11
6,628,015 B2 9/2003 Pullmann et al.
6,666,086 B2 * 12/2003 Colman et al. ............ 73/304 C
7,130,171 B2 10/2006 Pullmann et al.
7,446,437 B2 * 11/2008 Paik et al. ................... 307/115
2006/0232899 A1 10/2006 Heberlein

FOREIGN PATENT DOCUMENTS

DE 254 074 A1 2/1988
DE 100 11 211 A1 9/2001
DE 102 16 226 A1 10/2003
WO WO 2005/017932 2/2005

OTHER PUBLICATIONS

European Standard EN 954-1; 1996; 34 pages.
International Standard IEC 61508-2; First edition May 2000; 145 pages.
International Standard ISO 13849-1; Nov. 2006; 96 pages.

* cited by examiner

*Primary Examiner*—Stephen W Jackson
(74) *Attorney, Agent, or Firm*—Harness, Dickey & Pierce, P.L.C.

(57) ABSTRACT

A safety switching apparatus for safe disconnection of an electrical load in an automated installation has at least one input for connecting a signaling device. The safety switching apparatus has an evaluation and control unit and at least one switching element controlled by the evaluation and control unit in order to interrupt an electrical power supply path to the load. The switching element is a changeover switch having at least two mutually alternative switching paths, with a first switching path being located in the electrical power supply path to the load and with a second switching path leading to a monitoring unit.

23 Claims, 3 Drawing Sheets

SAFETY SWITCHING APPARATUS FOR SAFE DISCONNECTION OF AN ELECTRICAL LOAD

CROSS REFERENCES TO RELATED APPLICATIONS

This application is a continuation of international patent application PCT/EP2006/001484, filed on Feb. 18, 2006 designating the U.S., which international patent application has been published in German language and claims priority from German patent application DE 10 2005 014 125.0, filed on Mar. 22, 2005. The entire contents of these applications are incorporated herein by reference.

BACKGROUND OF THE INVENTION

The present invention relates to a safety switching apparatus for safe disconnection of an electrical load, in particular a load used in an automated installation. More particularly, the invention relates to safety switching apparatuses for safely shutting down a machine or installation in response to a safety requirement signaled by an emergency-off buttons, a light curtain, a guard door or other safety-related signaling devices.

DE 100 11 211 A1 discloses a prior art safety switching device in the form of a compact device unit which is generally intended for installation in a switchgear cabinet of an automated installation. Such a safety switching device typically has an (at least largely) predefined and fixed functional scope. Such safety switching devices exist in particular for evaluation of emergency-off buttons, guard doors, switching mats, two-hand switches, limit position and other position switches and other safety-related signaling devices. They typically include an evaluation and control unit designed for evaluation and/or monitoring of one or more signaling devices of a specific type. Depending on the signaling device, the evaluation and control unit produces a control signal, by means of which an electrical power supply path to the load can be interrupted in a fail-safe manner when required.

In addition, so-called safety controllers exist, whose functional scope is freely programmable in wide ranges, such as safety controllers, which are marketed by the present assignee under the brand name PSS®. The present invention relates in particular to compact safety switching devices which are relatively simple and low cost in comparison to such programmable controllers. However, the invention can also be used for safety controllers, for failsafe remote I/O units, or for other types of safety switching apparatuses.

In conventional safety switching devices, the at least one switching element typically is a positively guided relay, that is to say an electromechanical switching element having a plurality of make contacts and at least one break contact. The break contact and the make contacts are coupled to one another via a mechanical positive drive such that the break contact and the make contacts cannot be closed at the same time. The make contacts are normally closed by the evaluation and control unit during operation of the safety switching device and they are used to interrupt the electrical power supply path to the electrical load when required due to a safety function. A signal is typically fed back via the break contact to the evaluation and control unit, so that the latter can monitor the switching position of the make contacts on the basis of the positive drive. This makes it possible for the evaluation and control unit to detect when a make contact has become welded, and is stuck in its closed (or open) switch position. Because of this characteristic, positively driven relays have been proven to be very highly suitable in the field of safety switching devices and have been widely used for many years. However, positively driven relays are quite expensive and quite bulky.

DE 100 11 211 A1 proposes a safety switching device in which at least two electronic switching elements are used in order to interrupt the electrical power supply path to the load. In particular, transistors are proposed as switching elements. This allows a safety switching device to be produced in a smaller form, and at a lower cost. However, the safety switching device known from DE 100 11 211 A1 differs from most conventional safety switching devices not just in the use of transistors instead of positively guided relays. A further difference is that the transistors in the safety switching device each produce a potential-related output signal while, in contrast, safety switching devices having positively guided relays typically provide floating outputs. The latter means that the safety switching device does not per se produce an output signal, but only either passes on or does not pass on a potential that is connected from the outside. In contrast, the safety switching device known from DE 100 11 211 A1 produces "its own" output potential which is related to the ground for the safety switching device.

Safety switching devices with floating outputs (that is to say with positively guided relays as switching elements) are widely used in practice because this technique has been in use for many years. For spare-parts compatibility reasons, it is desirable to continue to have safety switching devices with floating outputs. Furthermore, floating outputs have the advantage that they can switch currents, voltages and frequencies in the load circuit over a very wide variation range. In contrast, the switching capacity of the safety switching device DE 100 11 211 A1 is restricted by the characteristics of the transistors used. Consequently, there is still a need for safety switching devices with floating outputs.

SUMMARY OF THE INVENTION

Against this background, it is an object of the present invention to provide a safety switching apparatus, which can be produced with floating outputs, but smaller and at a lower cost.

In view of this object, there is provided a safety switching apparatus for safe disconnection of an electrical load, comprising at least one input for connecting a signaling device, an evaluation and control unit, a switching element defining an electrical power supply path to the load, the switching element being controlled by the evaluation and control unit, and a monitoring unit designed for monitoring a switching position of the switching element, wherein the switching element comprises a changeover switch providing at least a first and a second switching path which are mutually alternative with respect to each other, with the first switching path being arranged in the electrical power supply path to the load and with the second switching path leading to the monitoring unit.

In addition, there is provided a safety switching apparatus for safe disconnection of an electrical load connected to a power supply path, the safety switching apparatus comprising at least one input for supplying a message signal from a signaling device, a monitoring and control unit, and at least one switching element controlled by the monitoring and control unit in order to interrupt the electrical power supply path, wherein the at least one switching element is a changeover switch having at least two mutually alternative switching paths, with a first switching path being located in the electrical power supply path to the load and with a second switching path leading to the monitoring and control unit.

The at least one switching element in the novel safety switching apparatus may be an electromechanical switching element, such as a changeover relay having three terminals, which provide two mutually alternative switching paths. As an alternative, however, the at least one switching element may also be in the form of a semiconductor component, or may be provided by means of semiconductor components. In principle, the at least one switching element may be a single part, which provides the at least two alternative switching paths, or it may be a more complex circuit structure, for example comprising a plurality of single transistors and/or relays.

The at least two switching paths of the switching element are closed alternatively to one another, that is to say the switching paths have a common root, but only one of the switching paths is ever closed at one time. Furthermore, the at least one switching element is arranged in the output circuit of the safety switching apparatus such that the first of the alternative switching paths is located in the electrical power supply path to the load, while a second alternative switching path is actually not in the electrical power supply path to the load, but leads to a monitoring unit. The monitoring unit is any desired part of the safety switching apparatus that can be used to determine whether the second switching path is or is not closed. In the first-mentioned case, because of the fact that the at least two switching paths are alternatives to one another, it can be assumed that the electrical power supply path to the electrical load is interrupted, provided that one can assume that the two switching paths are definitely alternatives to one another, that is to say they are mutually exclusive in all circumstances. Under this assumption, practical implementation is particularly simple.

However, even if the last-mentioned assumption cannot be reliably made, because, for example, it is necessary to assume that all the contact connections of the changeover switch can be connected to one another as a result of a fault, the novel safety switching apparatus allows a physically small implementation. This is because, in this situation, it is sufficient to cope with the assumed fault by means of a suitable functional test.

If the monitoring unit determines that the second switching path is not open, this does not unambiguously allow the conclusion that the "first switching path is closed" because the switching element could remain in an undefined intermediate position between the alternative switching paths. It is therefore possible for the electrical power supply path to the electrical load not to be closed, even though the second switching path to the monitoring unit is not closed either. Such a situation, however, does not present any problems from the viewpoint of safety, since it is primarily important to detect the disconnection of the load (that is to say the interruption of the first switching path or of the electrical power supply path to the load).

The novel safety switching apparatus does not require a positively guided relay in order to set up a feedback circuit for detecting if the electrical power supply path to the load has been interrupted. Since simple, non-positively-driven relays are considerably smaller and cost less than positively-driven relays, the novel safety switching apparatus can be produced smaller and at a lower cost than conventional safety switching apparatuses. This also applies, in particular, when a "simple" changeover relay is used as the at least one switching element. On the other hand, the novel safety switching apparatus can still be produced by means of changeover relays such that it has floating outputs. The novel safety switching apparatus can thus be made functionally compatible with conventional safety switching apparatuses having floating outputs. This makes it easier to replace conventional safety switching apparatuses in an existing installation by the novel safety switching apparatus, and it allows switching operations in the load circuit over a wide current, voltage and frequency range.

In principle, however, the novel safety switching apparatus can also be produced with nonfloating outputs. This might give up the advantage of floating outputs, but the use of a changeover switch makes it possible even in this situation to produce a very simple and reliable statement as to whether the electrical power supply path to the electrical load has or has not been interrupted. A safety switching apparatus can therefore also be provided easily and at low cost.

In a refinement of the invention, the changeover switch is designed such that it closes the second switching path as a default switching path.

In this refinement, the first switching path, which is located in the electrical power supply path to the load, is closed only when the changeover switch deliberately has been moved to the first switching position. When not energized, for example, when there is no voltage supply for the safety switching apparatus at all, the changeover switch returns on its own to the default state, provided that there is no fault in the changeover switch. This refinement allows a particularly cost-effective and physically small implementation.

In a further refinement, the evaluation and control unit and the monitoring unit together are designed to carry out a functional test of the changeover switch prior to the closure of the electrical power supply path. It is preferable if the monitoring unit is coupled to the evaluation and control unit for preventing the possibility of closure of the second switching path.

The combination of these two refinements ensures that the electrical power supply path to the load is closed only when the changeover switch correctly operates during the functional test (which is preferably carried out immediately prior to closing the power supply path). If it can be assumed that the electrical power supply path to the load can be interrupted at least once after a successful test, this results in a safety switching apparatus by means of which the (most stringent) safety category 4 of the European Standard EN 954-1, or a comparable standard based on PR-EN-ISO 13849-1 or IEC 61508 can be achieved. The assumption can be achieved by way of example when using diversity, redundant switching elements and by a design avoiding common-cause faults. The technical complexity is quite low in comparison to previous safety switching apparatuses, so that the stringent safety standard can be achieved very cost-effectively. However, the two refinements may in principle be implemented independently or separately from one another.

In a further refinement, the functional test includes the generation of a test signal which is passed via the second switching path.

The test signal is preferably chosen such that it is not capable of driving a load connected to that switching path. For example, the test signal may include one or more short pulses, whose pulse duration in each case is shorter than the response time of a connected load. Alternatively or in addition to this, the test signal may have an amplitude, a frequency or some other signal parameter which cannot be processed and/or detected by the load. Furthermore, in a refinement it is preferable for the safety switching apparatus to include a filter unit, which is designed to filter out or to suppress the test signal at or upstream of the connection point for the load. This prevents the load from being influenced by the test signal.

In a further refinement of the invention, the monitoring unit is at least partially integrated into the evaluation and control unit.

This refinement is especially preferable when a microcontroller or microprocessor forms part of the evaluation and control unit, since the function of the monitoring unit can then be implemented very easily.

In a further refinement, the novel safety switching apparatus comprises at least two changeover switches, whose first switching paths are arranged in series with one another.

This refinement is preferable when the two series-connected first switching paths create redundancy, which allows the load to be disconnected even if one of the changeover switches fails. The arrangement of the first switching path in series is a particularly simple and cost-effective implementation in this case.

In a further refinement, the safety switching apparatus includes at least two changeover switches whose second switching paths are arranged in series with one another. In this case, each changeover switch can preferably be switched independently of the other.

This refinement advantageously allows the monitoring and functional test for the changeover switches to be implemented very easily and with few components.

In a further refinement, the at least one changeover switch is a changeover relay.

For the purposes of this refinement, a changeover relay is an electromechanical component having at least three terminals, with one of the three terminals being a common terminal for the two alternative switching paths, while the second and third terminal are each associated with one of the alternative switching paths. Changeover relays of this type are available at low cost as standard components, are considerably smaller and cost considerably less than positively driven relays, and thus allow a particularly small and low-cost safety switching apparatus with floating outputs.

In an alternative refinement, the at least one changeover switch comprises a semiconductor switching element.

In this refinement, the changeover switch may be a single semiconductor switching element having two mutually alternative switching paths or else a circuit arrangement comprising, for example, a plurality of transistors which provide at least two alternative switching paths. The advantage of this refinement is that the at least one switching element can be implemented using integrated technology, such that it is even smaller and costs even less than if a relay were to be used.

In a further refinement, the monitoring unit is designed with a multichannel redundancy. Alternatively, or in addition to this, the evaluation and control unit may be designed with a multichannel redundancy.

This refinement is particularly advantageous when the novel safety switching apparatus is intended to be used for Category 4 applications according to European Standard EN 954-1, or comparable applications. The resulting requirements regarding the intrinsic fail-safety of the safety switching apparatus can be satisfied quite easily and reliably by a multichannel-redundant structure.

It goes without saying that the features mentioned above and those which are still to be explained in the following text can be used not only in the respectively stated combination but also in other combinations or on their own, without departing from the scope of the present invention.

BRIEF DESCRIPTION OF THE DRAWINGS

Exemplary embodiments of the invention will be explained in more detail in the following text and are illustrated in the drawing, in which.

DESCRIPTION OF PREFERRED EMBODIMENTS

Figure 1:
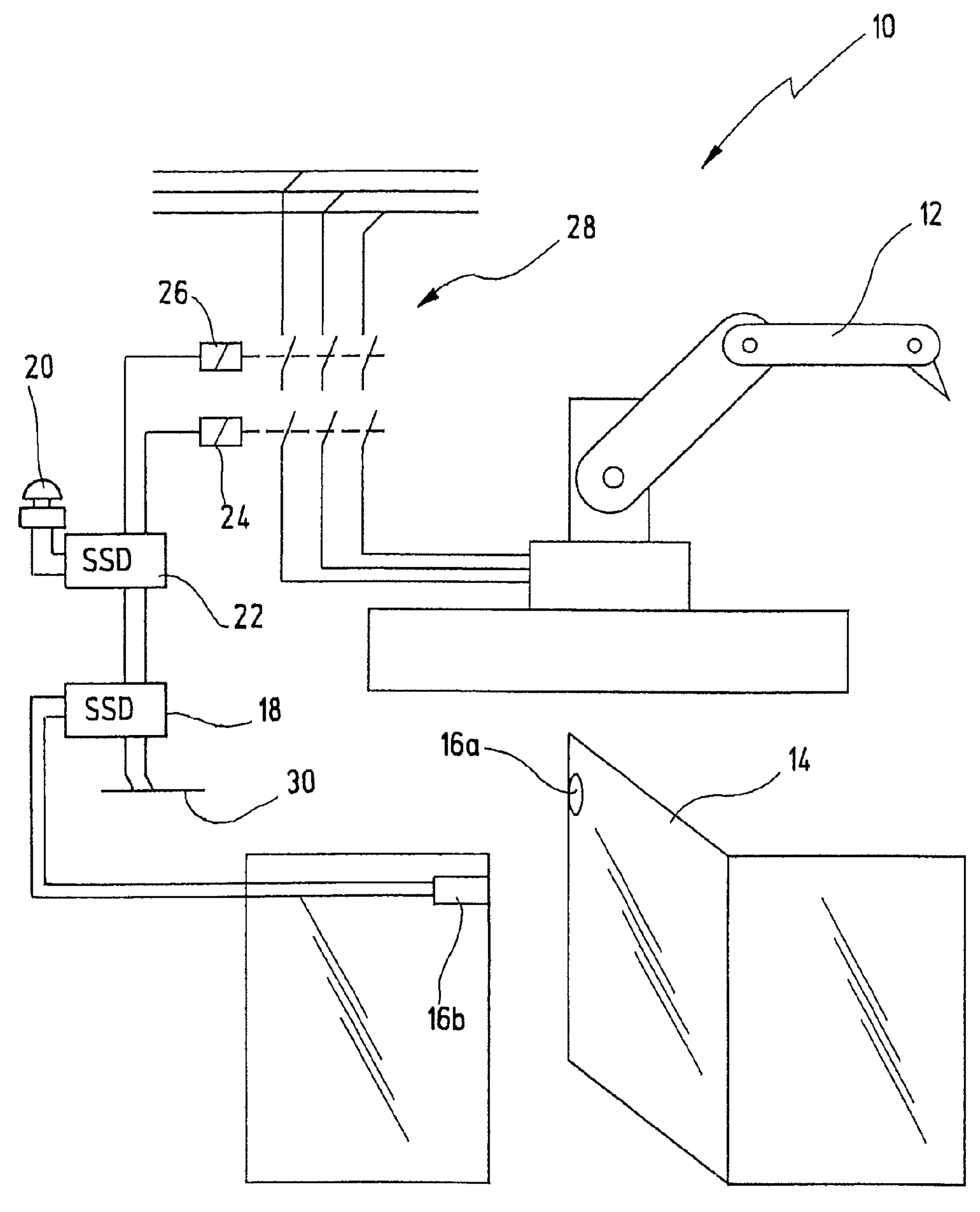
FIG. 1 shows a robot as an example of an automated installation having the novel safety switching apparatus.

In FIG. 1 an automated installation, where the novel safety switching apparatus is used, is designated by reference number 10.

In this case, the installation 10 includes a robot 12, whose operating area is protected by a guard fence with a guard door 14. The open or closed position of the guard door 14 is detected by a guard door sensor 16. The guard door sensor comprises a first part 16*a*, which is attached to the movable part of the guard door 14 and a second part 16*b* on the stationary frame of the guard door 14. In one exemplary embodiment, the first part 16*a* comprises a transponder, which can be identified and evaluated by the second part 16*b* (reader) only when the guard door is closed. The invention, however, is not restricted to guard door sensors of this type and, furthermore, is not restricted to guard door sensors as signaling devices. The invention can be used equally well with other signaling devices, such as emergency-off buttons, rotation speed sensors, light barriers and others.

Reference number 18 denotes a safety switching apparatus according to the present invention. It is used to shut-down the robot 12 when the guard door 14 is opened.

The installation 10 is also illustrated with an emergency-off button 20 as a further signaling device. The emergency-off button 20 is evaluated by a further safety switching apparatus 22 according to the present invention. The safety switching apparatuses 18 and 22 in the illustrated exemplary embodiment each have floating outputs (as will be explained in more detail within the following text with reference to FIG. 2), which are connected in series with one another in order to form a logic AND link.

At one end of the logic chain, in this case at the output of the safety switching apparatus 22, two contactors 24, 26 are arranged, whose make contacts are in turn connected in series with one another in an electrical power supply path 28 to the robot 12. The make contacts of the two contactors 24, 26 are normally open contacts, that is to say they are closed only when the input circuits of the contactors 24, 26 are energized by an operating voltage which is higher than the pull-in or holding voltage of the contactors 24, 26. The operating voltage 30 is, for example, 24 volts and in this exemplary embodiment is looped through to the contactors 24, 26 via the series-connected output contacts of the safety switching apparatuses 18 and 22. On opening of the guard door 14 and/or an operation of the emergency-off button 20, the safety switching apparatuses 18, 22 interrupt the switching path via which the input circuits of the contactors 24, 26 are connected to the operating voltage 30. In consequence, the contactors 24, 26 trip, disconnecting the robot 12. The contactors 24, 26 and (indirectly) the robot 12 are thus loads in terms of the present invention.

It goes without saying that the installation 10 is illustrated in a simplified form here. In particular, only two simple safety circuits are illustrated here for disconnection of the robot 12. In practice, there are typically further safety circuits. For example, the contactors 24, 26 typically have positively-guided break contacts which are fed back to at least one of the safety switching apparatuses 18, 22 in order to prevent the robot 12 from being started if one of the contactors 24, 26 is welded. Furthermore, an operation controller (not illustrated here) is typically provided, and controls the normal operating procedure for the robot 12.

Figure 2:
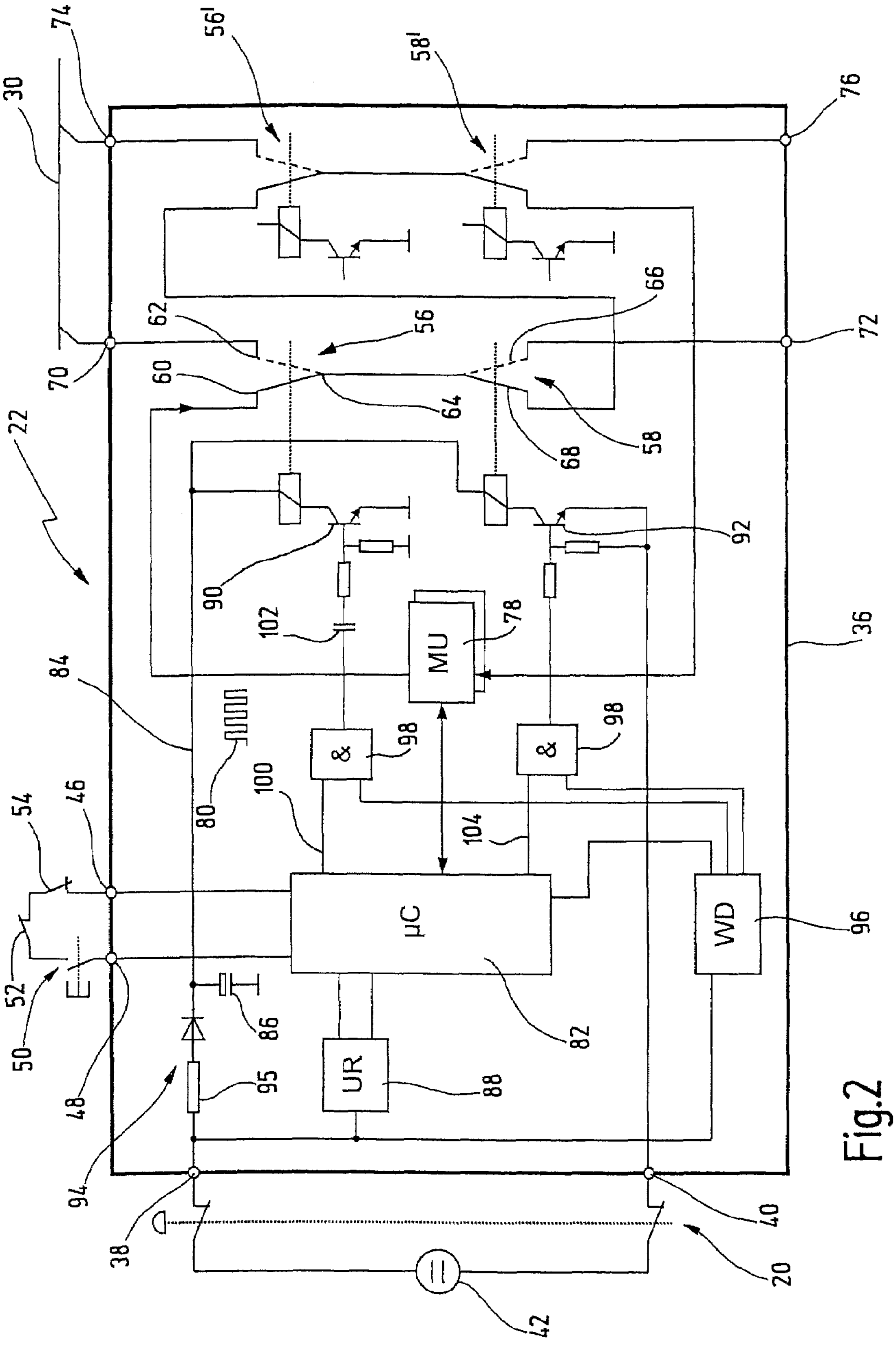
FIG. 2 shows a schematic illustration of a first exemplary embodiment of the novel safety switching apparatus.

FIG. 2 shows further details of the safety switching apparatus 22. In principle, the safety switching apparatus 18 can be designed in the same way or else may have a two-channel evaluation and control unit as well as floating outputs, in the conventional manner.

The components of the safety switching apparatus 22 are arranged in a manner known per se in a compact device housing 36. The housing 36 has terminal connections, for example in the form of screw terminals or spring terminals. Reference numbers 38, 40 denote two terminals which are used here both for connecting the emergency-off button 20 and for supplying a supply voltage 42 for the safety switching apparatus 22. In this case, the supply voltage 42 is shown as a DC voltage, and is connected to terminals 38, 40 via a respective break contact of the emergency-off button 20. As an alternative to this, the voltage 22 could in principle be an AC voltage.

Reference numbers 46, 48 denote two further connecting terminals, to which a series circuit comprising a start button 50 and two break contacts 52, 54 is connected. The break contact 52 is associated with the contactor 54 from FIG. 1 and is positively guided with the make contacts of the contactor 54. The break contact 54 is positively guided with the make contacts of the contactor 26 in the same way.

In this case, the safety switching apparatus 22 is illustrated with a total of four switching elements 56, 56', 58, 58'. The switching elements 56, 58 and 56', 58' are respectively arranged in series with one another and form two electrical power supply paths via which the two contactors 24, 26 can be energized. The second electrical power supply path together with the switching elements 56', 58' is illustrated only partially for sake of clarity, specifically without the details of the driver for the switching elements 56', 58'. However, the switching elements 56', 58' are driven in the same way as the switching elements 56, 58. For this reason, the following explanatory notes refer equally to the switching elements 56', 58' as well, unless stated to the contrary.

The switching elements 56, 58 are in the form of changeover switches. Each switching element 56, 58 has three terminal connections 60, 62, 64, which are shown here only for the switching element 56 for sake of clarity. The three terminal connections 60, 62, 64 form two mutually alternative switching paths. A first switching path 66 runs between the terminal connections 62 and 64 (represented by a dashed line in FIG. 2). A second, alternative switching path 68, runs from the terminal connection 60 to the terminal connection 64 (represented by a solid line). The terminal connection 64 thus forms a common root for the alternative switching paths 66, 68. Only one of the switching paths 66, 68 can ever be closed at one time. The other is open then.

In one exemplary embodiment of the invention, the changeover switches 56, 58 each are change over relays each having one contact, which is switched between the terminal connections 60, 62. In other embodiments, however, the changeover switches may also be in the form of, or at least formed with the aid of semiconductor switching elements.

The terminal connection 62 of the switching element 56 is connected to the terminal connection 70 on housing 36 of the safety switching apparatus 22. In the same way, the terminal connection 62 of the switching element 58 is connected to an external terminal 72 of the safety switching apparatus 22. The roots 64 of the two switching elements 56, 58 are connected in series with one another. The first switching paths 66 of the two switching elements 56, 58 therefore represent an electrical power supply path between the terminal connections 70, 72 of the safety switching apparatus 22, which can be closed or interrupted as a function of the switch position of the switching elements 56, 58. In the same way, the switching elements 56', 58' represent a second electrical power supply path between terminals 74, 76 of the safety switching apparatus 22. In the application shown in FIG. 1, the contactors 24, 26 are connected to the connecting terminals 72, 76. The operating voltage 30 is applied to the terminal connections 70, 74, and is looped through the safety switching apparatus 18, in the same manner as is described here.

The second switching path 68 of all four switching elements 56, 56', 58, 58' are in series with one another in this exemplary embodiment, and this series circuit is connected to a monitoring unit which is designated by reference number 78 in FIG. 2. The monitoring unit 78 may be a two-channel unit as indicated schematically in FIG. 2. However, it is also possible for the monitoring unit 78 to have only one channel. The purpose of the monitoring unit 78 is to feed a test signal 80 into the series circuit comprising the second switching paths 68 of the switching elements 56, 58, 56', 58'. If the monitoring unit 78 can read back the test signal 80 via said switching paths, this means that all the switching elements are in the switch position shown in FIG. 2. Consequently, the electrical power supply paths to the contactors 24, 26 are interrupted.

The monitoring unit 78 is connected to a microcontroller 82, which represents an evaluation and control unit in terms of the present invention. According to one preferred embodiment, only one microcontroller 82 is provided, although the invention is not restricted to this. The microcontroller 82 is configured to set the switch position of the switching elements 56, 58, 56', 58'. Furthermore, it carries out functional tests in the manner described in the following text, in order to check the switching operation of the switching elements 56, 58, 56', 58'.

For switching purposes, the switching elements 56, 58 require a supply voltage, which is applied to a line 84 and a capacitor 86. In this case, the supply voltage 84, 86 largely corresponds to the supply voltage 42, which is applied to the terminal connections 38, 40 of the safety switching apparatus 22. The voltage on line 84 is passed via the input circuit of the switching elements 56, 58 and a respective transistor 90, 92. The microcontroller 82 can close or interrupt the energizing circuit for each switching element 56, 58 by means of the transistors 90, 92. When the energizing circuit is closed and a supply voltage higher than the pull-in voltage of the switching elements 56, 58 is applied to the capacitor 86 and the line 84, the changeover switches switch over to the first switching path 66. If either the supply voltage on line 84 is missing (or the voltage falls below the holding voltage for the switching elements) or the microcontroller 82 interrupts the energizing circuit by means of the transistors 90, 92, the switching elements fall back to their default switching position, in which the second switching path 68 is closed. The electrical power supply paths to the contactors 24, 26 are then interrupted.

Reference number 88 denotes a voltage and reset circuit UR. In this case, this circuit comprises a voltage regulator (not illustrated separately) which uses the general supply voltage 42 to produce an individual supply voltage for the microcontroller 82. In addition, the voltage and reset circuit 88 ensures that the microcontroller 38 starts in a defined manner whenever the voltage returns at the terminal connections 38, 40 (reset function). In one exemplary embodiment, the voltage and reset circuit also comprises a pulse generator (not illustrated separately) which is connected to a reset input of the microcontroller 82. The supply voltages for the microcontroller 82 and the switching elements 56, 58 are thus both produced from the supply voltage 42 which is applied to the input of the safety switching apparatus 22. A decoupling network 94 is provided for decoupling the two internally isolated supply voltages. In the present exemplary embodiment, decoupling network 94 includes a diode and a resistor 95, which forms an RC element together with the capacitor 86. The resistor 95 governs the charging time for the capacitor 86 to be charged completely. The RC element comprising the resistor 95 and the capacitor 86 thus forms a delay element which ensures that the supply voltage for the switching elements 56, 58 is reached only after a certain delay, measured from the application of the supply voltage 42 to the terminal connections 38, 40.

Reference number 96 denotes what is called a watchdog, which includes a second delay element. On the one hand, the watchdog 86 is used to monitor the operation of the microcontroller 82 in a manner known per se. For this purpose, the watchdog 96 waits for regularly recurring pulses, which must be supplied from the microcontroller 82. Furthermore, the watchdog 86 is connected to a plurality of AND gates 98 for suppressing the transmission of the control signals from the microcontroller 82 to the transistors 90, 92.

In this exemplary embodiment, the switching elements 56, 58 are driven differently, that is to say with control signals which differ from one another. In the present case, switching element 56 (and switching element 56') is driven by a dynamic control signal (such as a defined pulse sequence), which the microcontroller 82 produces at an output 100. The control signal 100 is passed via an AND gate and a capacitor 102 to the transistor 90. The transistor 90 is switched on only when the microcontroller 82 produces the pulse sequence at the output 100 at the intended frequency and with the intended amplitude, and when the watchdog 96 passes on this pulse sequence to the capacitor 102.

In contrast, the switching elements 58, 58' are driven by a static signal 104 from the microcontroller 82. As an alternative to this, switching elements 56, 58 each could be driven with a dynamic signal or each could be driven with a static signal, although it is generally preferred for the control signals 100, 104 to differ from one another.

During fault analysis of the changeover switches 56, 58 in accordance with IEC 62061, the following faults should be considered:

1. The changeover switches 56, 58 remain in the energized (first) switching position 66, even though the input circuit is de-energized (not driven).
2. The changeover switches 56, 58 do not change to the first switch position 66 despite the input circuit being energized, but remain in the second default switch position 68.
3. There is a short between all of the terminal connections 60, 62, 64.

These faults can be coped with by the monitoring unit 78 testing the switching operation of the changeover switches 56, 58 in conjunction with the microcontroller 82, before the electrical power supply path to the load is closed. For this purpose, the monitoring unit 78 produces the test signal 80 and feeds it into the series circuit of the two switching paths 68. If all of the changeover switches are in their de-energized default state, the monitoring unit 78 should be able to read back the test signal 80. In the next step, the changeover switch 56, for example, is switched by the microcontroller 82. It must now no longer be possible to read back the test signal 80 if the switching of the changeover switch has taken place correctly and there is no short between the terminal connections 60, 62, 64. Once this test has passed, the monitoring unit checks the other changeover switches one by one. If the test signal 80 can be read back in one of the test situations, one of the abovementioned faults is present. The monitoring unit 78 informs the microcontroller 82 in an appropriate form, and prevents closure of the electrical power supply path to the contactors 24, 26. If, in contrast, all of the changeover switches pass the test, the electrical power supply path to the contactors 24, 26 can be closed. If one changeover switch in this case were not to switch over to the first switching path 66, it would not be possible to switch on the connected load. This would therefore ensure a safe state, despite the (untested) fault.

Figure 3:
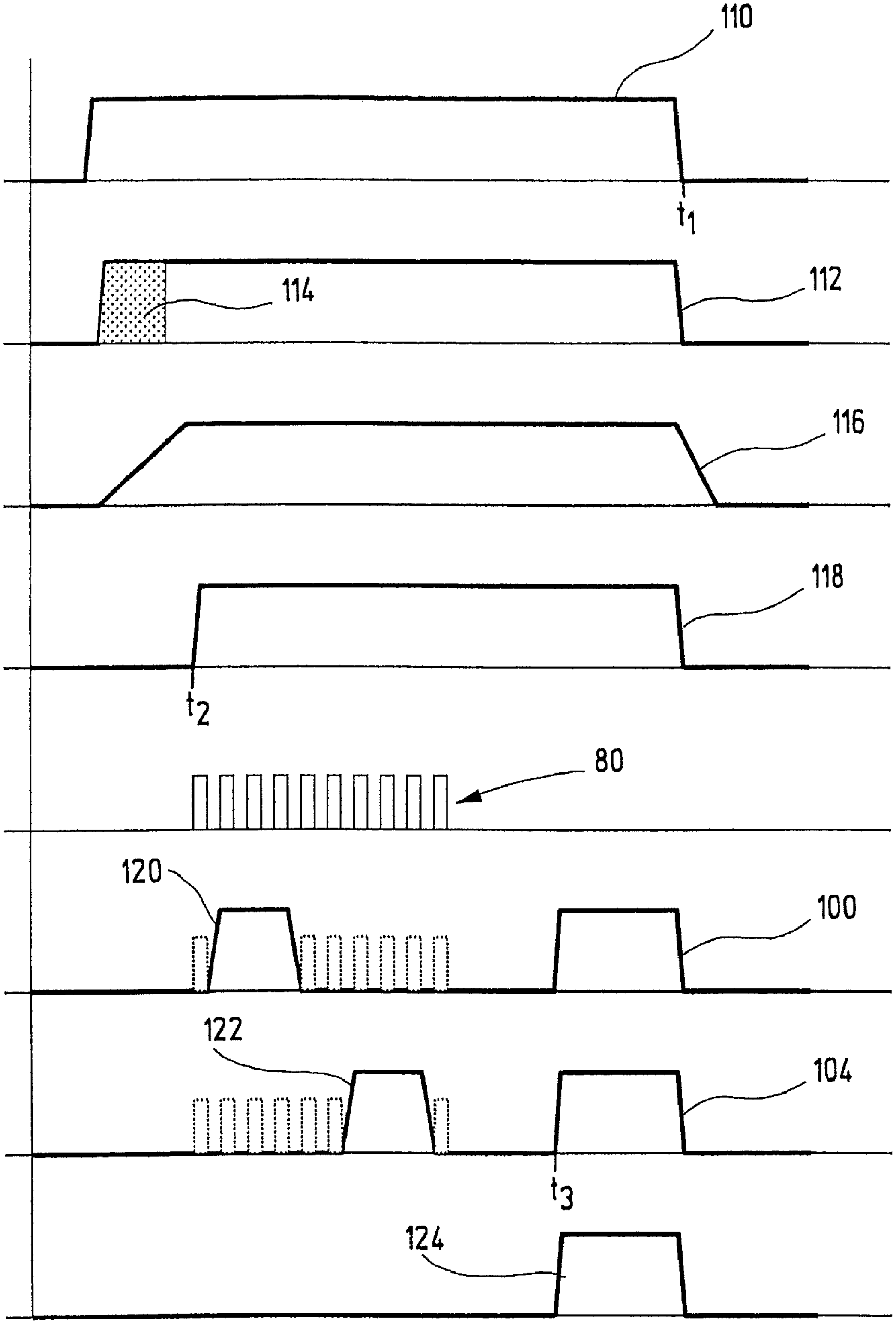
FIG. 3 shows a number of timing diagrams in order to explain a method of operation of one exemplary embodiment of the novel safety switching apparatus.

This method of operation is once again schematically illustrated in the timing diagrams in FIG. 3. The top waveform 110 shows the application of the supply voltage 42 to the safety switching apparatus 22, irrespective of whether this is for connecting the entire installation or for closure of the emergency-off button 20. It is assumed that the emergency-off button 20 is operated at a time $t_1$, so that the supply voltage 42 is disconnected from the safety switching apparatus 22.

The second waveform 112 shows the supply voltage for the microcontroller 82, which is produced by means of the voltage and reset circuit 88. During a first time interval 114 after the application of the supply voltage to the microcontroller 82 (or after a reset), the microcontroller 82 carries out internal functional tests, as is known from operation of microcontrollers in safety switching apparatuses.

The third waveform 116 shows the waveform of the supply voltage on the energizing circuits of the switching elements 56, 58. In this case, the supply voltage initially starts to rise relatively slowly, because of the time response of the RC element 95, 86. The dimensions of the components are thus chosen such that the supply voltage is not completely applied to the switching elements 56, 58 until the microcontroller 82 has completed its internal self-tests.

The fourth waveform 118 is the output signal of the watchdog 96. This signal is used to switch the outputs 100, 104 of the microcontroller 82 to the transistors 90, 92 to the switching element 56, 58. Only after the time $t_2$ is the microcontroller 82 able to drive the switching elements 56, 58.

The fifth waveform shows the test signal 80, which is fed into the circuit of the second switching paths 68 from the monitoring unit 78.

The control signals 100 and 104 for the switching elements 56, 58 are now shown in the two next waveforms. First, a control signal is activated for a respective time interval 120 or 122, with the time intervals 120, 122 being offset with respect to one another. Furthermore, the control signals in the time intervals 120, 122 occur at the same time as the test signal 80. If the test signal 80 can no longer be read back by the monitoring 78 during respective time intervals 120, 122, as is indicated schematically in FIG. 3, the switching of the corresponding switching element 56, 58 was successful. After successful completion of the tests, the microcontroller 82 can switch the switching elements 56, 58 to their first switch position 66, thus closing the electrical power supply paths to the contactors 24, 26 (time $t_3$).

Finally, the bottom diagram shows the waveform 124 of the operating voltage 30 on the input circuits of the contactors 24, 26. The contactors 24, 26 can pull in from the time $t_3$, and the robot 12 can be operated. If the emergency-off button 20 is operated at the time $t_1$, the supply voltage for the switching elements 56, 58 falls away (neglecting a discharge time, which is not considered here, for the capacitor 86). Furthermore, the control signals 100, 104 for the switching elements 56, 58 are lacking. Both events result in the electrical power supply path to the contactors 24, 26 being interrupted.

In further exemplary embodiments, the functionality of the monitoring unit 78 can be at least partially integrated in the microcontroller 82. For example, it is preferred if the test signal 80 from the microcontroller 82 is coupled into the monitoring circuit of the second switching path via an optocoupler, a capacitive coupling or an inductive coupling. The part which is referred to here as the monitoring unit 78 may then, for example, include an optocoupler or a transformer.

Furthermore, exemplary embodiments of the invention can include the changeover switches 56, 58 each having a plurality of parallel switching contacts. In this case, the read-back paths of the monitoring unit 78 can be formed in parallel.

It is also possible that the changeover switches 56, 58 each have their own monitoring unit 78, which produces an individual test signal for the respective changeover switches. The plurality of monitoring units can then be connected to the microcontroller 82 in order to signal the results of the functional tests to the microcontroller 82. In addition, the second switching paths of the changeover switches 56, 58 can be connected in series with one another, while the second switching paths of the changeover switches 56', 58' form a second series circuit, which is formed separately from the series circuit of the changeover switches 56, 58.

Finally, it should be noted that the present invention can also be implemented with safety switching apparatuses which have a "conventional" two-channel or multichannel evaluation and control unit, as is shown by way of example in DE 100 11 211 A1. The implementation described in the above exemplary embodiment is only one preferred embodiment here, which itself represents an inventive development of prior art safety switching apparatuses.

What is claimed is:

1. A safety switching apparatus for safe disconnection of an electrical load, comprising:

at least one input for connecting a signaling device, an evaluation and control unit, a switching element having first and second switching positions defining first and second alternative switching paths, respectively, said first switching path defining an electrical power supply path to the load, the switching element being controlled by the evaluation and control unit, and a monitoring unit connected to the evaluation and control unit and to the switching element for monitoring the switching position of the switching element, wherein the switching element comprises a changeover switch providing said first and second alternative switching paths and further wherein the first switching path is arranged in the electrical power supply path to the load and the second switching path is connected to the monitoring unit.

2. The safety switching apparatus of claim 1, wherein the changeover switch is designed such that it closes the second switching path as a default switching path.

3. The safety switching apparatus of claim 1, wherein at least one of the evaluation and control unit and the monitoring unit is designed to carry out a functional test of the switching element prior to the closure of the electrical power supply path.

4. The safety switching apparatus of claim 3, wherein the functional test includes the generation of a test signal which is passed via the second switching path.

5. The safety switching apparatus of claim 1, wherein the monitoring unit is coupled to the evaluation and control unit for preventing closure of the first switching path.

6. The safety switching apparatus of claim 1, wherein the monitoring unit is integrated into the evaluation and control unit.

7. The safety switching apparatus of claim 1, comprising a second changeover switch providing at least a third and a fourth switching path which are mutually alternative with respect to each other, wherein the first and the third switching paths are arranged in series with one another in order to define the power supply path to the load.

8. The safety switching apparatus of claim 7, wherein the second and the fourth switching paths am arranged in miles with one another.

9. The safety switching apparatus of claim 1, wherein the changeover switch is a changeover relay.

10. The safety switching apparatus of claim 1, wherein the changeover switch comprises a semiconductor switching element.

11. The safety switching apparatus of claim 1, wherein the monitoring unit is designed with a multichannel redundancy.

12. The safety switching apparatus of claim 1, wherein the evaluation and control unit is designed a single channel evaluation and control unit.

13. A safety switching apparatus for safe disconnection of an electrical load connected to a power supply path, the safety switching apparatus comprising:

at least one input for supplying a message signal from a signalling device, a monitoring and control unit, and at least one switching element controlled by the monitoring and control unit in order to interrupt the electrical power supply path, and having first and second switching positions defining first and second alternative switching paths, respectively, wherein the at least one switching element is a changeover switch providing said first and second alternative switching paths, with the first switching path being located in the electrical power supply path to the load and with the second switching path leading to the monitoring and control unit to enable said monitoring and control unit to monitor the switching position of said changeover switch.

14. The safety switching apparatus of claim 13, wherein the changeover switch is designed such that it closes the second switching path as a default switching path.

15. The safety switching apparatus of claim 13, wherein the monitoring and control unit is designed to generate a test signal which is passed via the second switching path in order to check the switching position of the changeover switch.

16. The safety switching apparatus of claim 13, wherein the monitoring and control unit is designed to check the switching position prior to closure of the electrical power supply path.

17. The safety switching apparatus of claim 13, comprising at least two changeover switches each having a first and a second alternative switching path, with the first switching paths of the at least two changeover switches being arranged in series with one another.

18. The safety switching apparatus of claim 17, wherein the second switching paths of the at least two changeover switches are arranged in series with one another.

19. The safety switching apparatus of claim 13, wherein the changeover switch is a changeover relay.

20. The safety switching apparatus of claim 13, wherein the monitoring and control unit is designed with a multichannel redundancy.

21. A safety switching apparatus for safe disconnection of an electrical load, comprising:

at least one input for connecting a signaling device, an evaluation and control unit, a switching element defining an electrical power supply path to the load, the switching element being controlled by the evaluation and control unit, and a monitoring unit designed for monitoring a switching position of the switching element, wherein the switching element comprises a changeover switch providing at least a first and a second switching path which are mutually alternative with respect to each other, with the first switching path being arranged in the electrical power supply path to the load and with the second switching path leading to the monitoring unit, and further wherein the changeover switch is designed such that it closes the second switching path as a default switching path.

22. A safety switching apparatus for safe disconnection of an electrical load connected to a power supply path, the safety switching apparatus comprising:

at least one input for supplying a message signal from a signalling device, a monitoring and control unit, and at least one switching element controlled by the monitoring and control unit in order to interrupt the electrical power supply path, wherein the at least one switching element is a changeover switch having at least two mutually alternative switching paths, with a first switching path being located in the electrical power supply path to the load and with a second switching path leading to the monitoring and control unit, and further wherein the changeover switch is designed such that it closes the second switching path as a default switching path.

23. The safety switching apparatus of claim 1, wherein the monitoring unit provides a signal to the evaluation and control unit that identifies the switching position of the switching element.

* * * * *

UNITED STATES PATENT AND TRADEMARK OFFICE

CERTIFICATE OF CORRECTION

PATENT NO. : 7,672,109 B2
APPLICATION NO. : 11/858925
DATED : March 2, 2010
INVENTOR(S) : Thomas Nitsche et al.

It is certified that error appears in the above-identified patent and that said Letters Patent is hereby corrected as shown below:

Column 12,
Line 11, “am” should be -- are --; “miles” should be -- series --.
Line 21, after “designed” insert -- as --.

Signed and Sealed this

Eighteenth Day of May, 2010

David J. Kappos
*Director of the United States Patent and Trademark Office*